US012592598B2

(12) United States Patent
David et al.

(10) Patent No.: US 12,592,598 B2
(45) Date of Patent: Mar. 31, 2026

(54) SYSTEMS FOR ROTOR INCLUDING COMPOSITE MATERIAL

(71) Applicant: BorgWarner Luxembourg Automotive Systems SA, Bascharage (LU)

(72) Inventors: Pascal David, Luxembourg (LU); Eric Bourniche, Preutin-Higny (FR)

(73) Assignee: BorgWarner Luxembourg Automotive Systems SA, Bascharage (LU)

( * ) Notice: Subject to any disclaimer, the term of this patent is extended or adjusted under 35 U.S.C. 154(b) by 239 days.

(21) Appl. No.: 18/613,910

(22) Filed: Mar. 22, 2024

(65) Prior Publication Data

US 2025/0300508 A1     Sep. 25, 2025

(51) Int. Cl.
| | |
|---|---|
| *H02K 1/28* | (2006.01) |
| *B60L 15/02* | (2006.01) |
| *H02K 1/276* | (2022.01) |
| *H02K 21/14* | (2006.01) |

(52) U.S. Cl.
CPC ................ *H02K 1/28* (2013.01); *B60L 15/02* (2013.01); *H02K 1/276* (2013.01); *H02K 21/14* (2013.01); *B60L 2210/42* (2013.01)

(58) Field of Classification Search
CPC .......... H02K 1/28; H02K 1/276; H02K 21/14; B60L 15/02; B60L 2210/42
See application file for complete search history.

(56) References Cited

U.S. PATENT DOCUMENTS

| | | | |
|---|---|---|---|
| 4,469,970 A | 9/1984 | Neumann | |
| 5,111,094 A | 5/1992 | Patel et al. | |
| 10,720,808 B2 | 7/2020 | Vikman et al. | |
| 2008/0238234 A1 | 10/2008 | Saban et al. | |
| 2010/0019614 A1* | 1/2010 | Arend .................... | H02K 19/22 |
| | | | 310/216.106 |
| 2023/0070394 A1 | 3/2023 | Fatemi et al. | |
| 2023/0179045 A1 | 6/2023 | Olsen et al. | |
| 2025/0192630 A1* | 6/2025 | Zhou ........................ | H02K 1/28 |

* cited by examiner

*Primary Examiner* — Sean Gugger
(74) *Attorney, Agent, or Firm* — Bookoff McAndrews, PLLC

(57)     ABSTRACT

A system includes a motor including: a stator; and a rotor including: a rotor shaft; a lamination stack including: a lamination yoke including a recess in an outermost surface of the lamination yoke and a first groove in the outermost surface of the lamination yoke; a lamination shoe in the recess of the lamination yoke, the lamination shoe including a second groove in an outermost surface of the lamination shoe; and one or more first magnets in the recess of the lamination yoke, each first magnet of the one or more first magnets including a first magnet groove, wherein the first groove of the lamination yoke, the second groove of the lamination shoe, and the first magnet groove are aligned along a first circumference of the lamination stack as a first lamination stack groove; and one or more carbon rings in the first lamination stack groove.

20 Claims, 7 Drawing Sheets

SYSTEMS FOR ROTOR INCLUDING COMPOSITE MATERIAL

TECHNICAL FIELD

Various embodiments of the present disclosure relate generally to an electric rotor, and more specifically, to systems including composite material as a reinforcement for an electric rotor.

BACKGROUND

A rotor, such as used in an electric motor, for example, is subjected to high centrifugal forces during operation. To maintain structural integrity of the rotor, some rotors include additional material, such as a larger lamination bridge, at an exterior of the rotor. However, the additional material affects the performance of the motor.

The present disclosure is directed to overcoming one or more of these above-referenced challenges.

SUMMARY OF THE DISCLOSURE

In some aspects, the techniques described herein relate to a system including a motor, the motor including: a stator including one or more windings; and a rotor to rotate relative to the stator based on a current in the one or more windings, the rotor including: a rotor shaft; a lamination stack on the rotor shaft, the lamination stack including: a lamination yoke including a recess in an outermost surface of the lamination yoke and a first groove in the outermost surface of the lamination yoke; a lamination shoe in the recess of the lamination yoke, the lamination shoe including a second groove in an outermost surface of the lamination shoe; and one or more first magnets in the recess of the lamination yoke between the lamination yoke and the lamination shoe, each first magnet of the one or more first magnets including a first magnet groove, wherein the first groove of the lamination yoke, the second groove of the lamination shoe, and the first magnet groove are aligned along a first circumference of the lamination stack as a first lamination stack groove; and one or more carbon rings in the first lamination stack groove.

In some aspects, the techniques described herein relate to a system, further including: one or more second magnets in the recess of the lamination yoke between the lamination yoke and the lamination shoe, each second magnet of the one or more second magnets including a second magnet groove, wherein the lamination yoke includes a third groove in the outermost surface of the lamination yoke, and the lamination shoe includes a fourth groove in the outermost surface of the lamination shoe, and wherein the third groove of the lamination yoke, the fourth groove of the lamination shoe, and the second magnet groove are aligned along a second circumference of the lamination stack as a second lamination stack groove.

In some aspects, the techniques described herein relate to a system, further including: one or more carbon rings in the second lamination stack groove.

In some aspects, the techniques described herein relate to a system, wherein the one or more carbon rings cover from approximately 15% of an outermost surface of the lamination stack to approximately 85% of the outermost surface of the lamination stack.

In some aspects, the techniques described herein relate to a system, further including: one or more carbon tubes extending through the lamination shoe of the lamination stack in a direction parallel to an axial direction of the rotor shaft.

In some aspects, the techniques described herein relate to a system, wherein the rotor does not include a bridge to stabilize the one or more first magnets in the recess of the lamination yoke.

In some aspects, the techniques described herein relate to a system, further including: an inverter configured to convert DC power from a battery to AC power to drive the one or more windings of the stator of the motor; and the battery configured to supply the DC power to the inverter, wherein the system is provided as a vehicle including the inverter, the battery, and the motor.

In some aspects, the techniques described herein relate to a system including a rotor, the rotor including: a rotor shaft; a lamination stack on the rotor shaft, the lamination stack including: a lamination yoke including a recess in an outermost surface of the lamination yoke and a first groove in the outermost surface of the lamination yoke; a lamination shoe in the recess of the lamination yoke, the lamination shoe including a second groove in an outermost surface of the lamination shoe; and one or more first magnets in the recess of the lamination yoke between the lamination yoke and the lamination shoe, each first magnet of the one or more first magnets including a first magnet groove, wherein the first groove of the lamination yoke, the second groove of the lamination shoe, and the first magnet groove are aligned along a first circumference of the lamination stack as a first lamination stack groove; and a first carbon ring in the first lamination stack groove.

In some aspects, the techniques described herein relate to a system, the rotor further including: one or more second magnets in the recess of the lamination yoke between the lamination yoke and the lamination shoe, each second magnet of the one or more second magnets including a second magnet groove, wherein the lamination yoke includes a third groove in the outermost surface of the lamination yoke, and the lamination shoe includes a fourth groove in the outermost surface of the lamination shoe, and wherein the third groove of the lamination yoke, the fourth groove of the lamination shoe, and the second magnet groove are aligned along a second circumference of the lamination stack as a second lamination stack groove.

In some aspects, the techniques described herein relate to a system, the rotor further including: a second carbon ring in the second lamination stack groove.

In some aspects, the techniques described herein relate to a system, wherein the first carbon ring covers from approximately 15% of an outermost surface of the lamination stack to approximately 85% of the outermost surface of the lamination stack.

In some aspects, the techniques described herein relate to a system, the rotor further including: a carbon tube extending through the lamination shoe of the lamination stack in a direction parallel to an axial direction of the rotor shaft.

In some aspects, the techniques described herein relate to a system, wherein the lamination yoke includes a plurality of lamination yoke sheets, and the lamination shoe includes a plurality of lamination shoe sheets.

In some aspects, the techniques described herein relate to a system, wherein the rotor does not include a bridge to stabilize the one or more first magnets in the recess of the lamination yoke.

In some aspects, the techniques described herein relate to a system including a rotor, the rotor including: a rotor shaft; a lamination stack including a first lamination sheet, a second lamination sheet, and one or more magnets, the first lamination sheet and the second lamination sheet on the rotor shaft, and the first lamination sheet having a greater circumference than the second lamination sheet; the first lamination sheet including: a first lamination yoke including a first recess in an outermost surface of the first lamination yoke; and a first lamination shoe located in the first recess; the second lamination sheet including: a second lamination yoke including a second recess in an outermost surface of the second lamination yoke; and a second lamination shoe located in the second recess; the one or more magnets including a first portion and a second portion, the first portion of the one or more magnets having a greater thickness than the second portion of the one or more magnets, the one or more magnets being in the first recess between the first lamination yoke and the first lamination shoe and in the second recess between the second lamination yoke and the second lamination shoe, wherein the first portion of the one or more magnets aligns along a first circumference of the lamination stack with the first lamination sheet and the second portion of the one or more magnets aligns along a second circumference of the lamination stack with the second lamination sheet; and a carbon ring on the outermost surface of the second lamination yoke, an outermost surface of the second lamination shoe, and an outermost surface of the second portion of the one or more magnets.

In some aspects, the techniques described herein relate to a system, wherein the lamination stack further includes: a third lamination sheet, the third lamination sheet having a circumference equal to the second lamination sheet; the third lamination sheet including: a third lamination yoke including a third recess in an outermost surface of the third lamination yoke; and a third lamination shoe located in the third recess; the one or more magnets further being in the third recess between the third lamination yoke and the third lamination shoe, wherein the second portion of the one or more magnets further aligns along a third circumference of the lamination stack with the third lamination sheet.

In some aspects, the techniques described herein relate to a system, wherein the carbon ring is further located on an outermost surface of the third lamination yoke and an outermost surface of the third lamination shoe.

In some aspects, the techniques described herein relate to a system, further including: a carbon tube, wherein the first lamination shoe includes a first hole, wherein the second lamination shoe includes a second hole, and wherein the carbon tube extends through the first hole and the second hole in a direction parallel with an axial direction of the rotor shaft.

In some aspects, the techniques described herein relate to a system, wherein the one or more magnets include a first magnet and a second magnet.

In some aspects, the techniques described herein relate to a system, wherein the rotor does not include a bridge between the first lamination yoke and the first lamination shoe, or between the second lamination yoke and the second lamination shoe.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
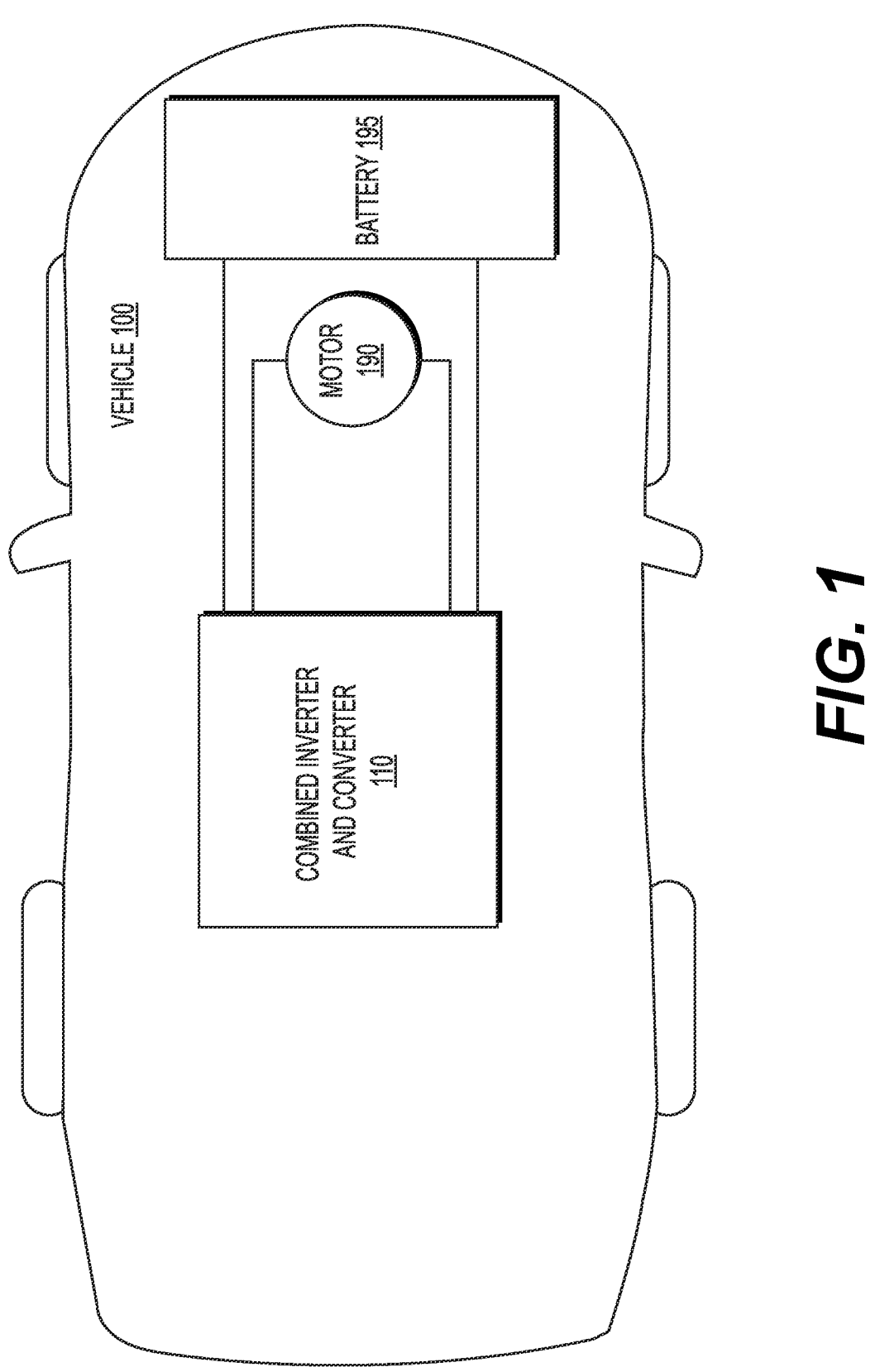
FIG. 1 depicts an exemplary system infrastructure for a vehicle including a combined inverter and converter, according to one or more embodiments.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of +10% in the stated value. In this disclosure, unless stated otherwise, any numeric value may include a possible variation of +10% in the stated value.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. For example, in the context of the disclosure, the carbon rings may be described as composite rings, carbon rings, or rings, but may refer to any type of material used for reinforcement for electric rotors as described herein. For example, composite rings may be carbon fiber or another composite material, of any combination thereof, but not limited thereto.

Various embodiments of the present disclosure relate generally to an electric rotor, and more specifically, to systems including composite material as a reinforcement for an electric rotor. Composite sleeves are used as reinforcement for electric rotors and generators to retain magnets on high speed applications. Motor and generator units with composite sleeves are used in a variety of applications due to the need to improve speed and energy efficiency. For example, carbon fiber composites are chosen for such applications because carbon fiber composites have excellent stiffness to weight ratio as well as excellent strength to weight ratio.

When rotating at high speed, permanent magnets used for a rotor (e.g. for a motor or electric machine) are subjected to high centrifugal forces and need to be strongly attached. Some retention strengthening methods implemented in rotor designs include increasing the size of the lamination bridges, or removing the lamination bridges and wrapping an entire length of the rotor with fiber composite material. Utilizing a lamination bridge increases the structure strength needed for operating at higher speeds. However, the problem with a lamination bridge is the material (e.g., metal) used may affect the shunt and magnet flux (e.g., magnet utilization), where the use of a larger bridge reduces interaction between rotor and stator fields (e.g., magnet utilization) and thus provides poor machine performance.

Utilizing a composite sleeve may maintain structural integrity of the rotor at high speeds, similar to a lamination bridge. The composite sleeve is non-magnetic, thereby avoiding the shunt affect and increased magnet flux. However, the problem with the composite wrapping is the air gap increase induced by the composite material implemented to wrap the rotor. For example, a wider air gap degrades magnet utilization and thus results in a poor machine performance. Carbon fiber used in composite sleeves is frequently a choice for such applications as carbon fiber has an excellent stiffness to weight ratio as well as excellent strength to weight ratio and limiting the air gap.

Selecting a material of carbon for the composite sleeve, and carbon being a non-magnetic material, allowing for the removal of lamination bridges, has the benefit of eliminating the magnetic shunt and increases magnet utilization. However, the fabrication process to create the composite sleeve requires a significant amount of carbon fibers and time. Also, the carbon composite sleeve must take into account the high speed capability (e.g., high sleeve thickness) and high magnet utilization (e.g., low sleeve thickness).

One or more embodiments may include several carbon rings localized along the rotor, creating a segmented sleeve instead of using a single sleeve along an entire length the rotor. One or more embodiments may include axial carbon tubes to balance remaining centrifugal forces acting on shoe laminations. In doing so, the needed retention constraint (e.g., performed previously by a bridge or composite sleeve along the entirety of the rotor) may be provided only where it is necessary. This allows design flexibility to adjust for the ratio between the maximum speed and the magnet utilization.

For example, in order to implement several carbon rings, the lamination design may include four different types of laminations: first, a lamination yoke with reduced outer diameter, second, a lamination shoe with reduced outer diameter, third, a lamination yoke with nominal outer diameter, and fourth, a lamination shoe with nominal outer diameter. As a product, the air gap profile may be reduced at the sleeve free portion and increased at the sleeved portion. Accordingly, the centrifugal forces may be balanced using two structural elements: the carbon sleeve ring that maintains the shoe and the magnet at the sleeved portion, and the carbon tube that maintains the shoe at the sleeve free portion.

The axial width of the sleeve as well as the number of sleeves used to build the complete rotor may be adjusted based on the application specific needs (e.g., to fulfill the targeted maximum rotor speed and to keep magnet utilization at a maximum). For example, as the sleeve size increases, a higher speed may be achievable, but the flux utilization drops. In contrast, as the sleeve size decreases, a lower speed may be required, but with a higher flux utilization. A mitigation of this trend may occur by adjusting: the number of sleeves, the size of each sleeve (e.g., may be different pending on position relative to magnet), and the position relative to magnet (e.g., at the center or intermediate positions, or even overlapping two magnets). As a result, wasted magnet energy may be mitigated compared to some methods (e.g., 100% sleeved area or using lamination bridges).

One or more embodiments may include lamination bridges which are fully removed, avoiding flux shunt and providing high magnet utilization. In one or more embodiments, the air gap may be increased only locally, preserving a good magnet utilization. In one or more embodiments, higher speeds may be achieved with respect to the centrifugal force balancing using carbon rings and/or tubes. For example, the carbon ring sleeve may provide a better rotor magnetic field efficiency due to the position of the magnets closer to the outer diameter. In terms of material cost, the carbon ring sleeve may reduce the amount of carbon needed to keep the magnets and laminations in place (e.g., only rings where it is needed, and not a complete wrapping of the rotor).

One or more embodiments may include a carbon ring sleeve to reduce the fabrication time and cost (e.g., less wrapping surface needed). One or more embodiments may improve the speed limit and the motor efficiency. For example, the carbon ring sleeve may be implemented by using carbon fiber or other type of composite material. The carbon ring sleeve may be applied to several type of motors (e.g., surface mounted permanent magnet synchronous motor). One or more embodiments may include altering the number and size of the carbon rings based on application specific needs.

FIG. 1 depicts an exemplary system infrastructure for a vehicle including a combined inverter and converter, according to one or more embodiments. Alternatively, the inverter may be an inverter without a converter. In the context of this disclosure, the inverter without a converter, or the combined inverter and converter, may be referred to as an inverter. As shown in FIG. 1, electric vehicle 100 may include an inverter 110, a motor 190, and a battery 195. The inverter 110 may include components to receive electrical power from an external source and output electrical power to charge the battery 195 of electric vehicle 100. The battery 195 may supply DC power to the inverter 110 for conversion into AC power, to drive (e.g., rotate) the motor 190 of the electric vehicle 100, for example, but the embodiments are not limited thereto. The inverter 110 may be bidirectional, and may convert DC power to AC power, or convert AC power to DC power, such as during regenerative braking, for example. The inverter 110 may be a three-phase inverter, a single-phase inverter, or a multi-phase inverter.

Figure 2:
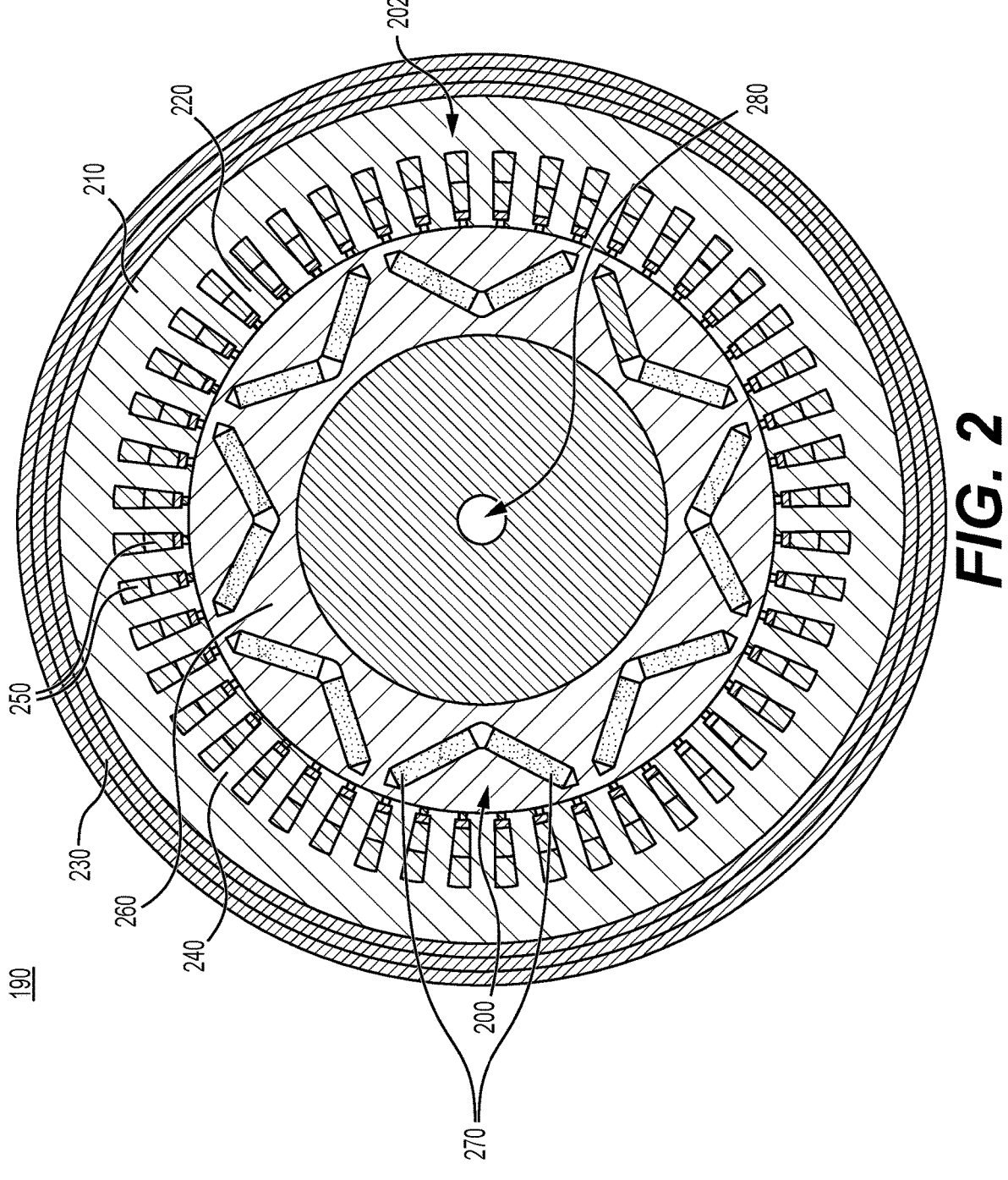
FIG. 2 depicts an exemplary cross-section view of a motor, according to one or more embodiments.

FIG. 2 depicts an exemplary cross-section view of a motor, according to one or more embodiments. The motor 190 may include a rotor 200 and a stator 202. The stator 202 may include a stator yoke 210, stator inner teeth 220, a water jacket 230, stator outer teeth 240, and windings 250. Rotor 200 may include rotor lamination stack 260 and rotor shaft 280. The rotor lamination stack 260 may include one or more lamination sheets. The rotor lamination stack 260 may include magnet 270 (e.g., magnet 270 may include one or more magnets). The magnet 270 may be aligned in a parallel direction to the rotor shaft 280. For example, rotor 200 may rotate relative to the stator 202 based on a current in the windings 250.

Figures 3A, 3B, 3C, 3D:
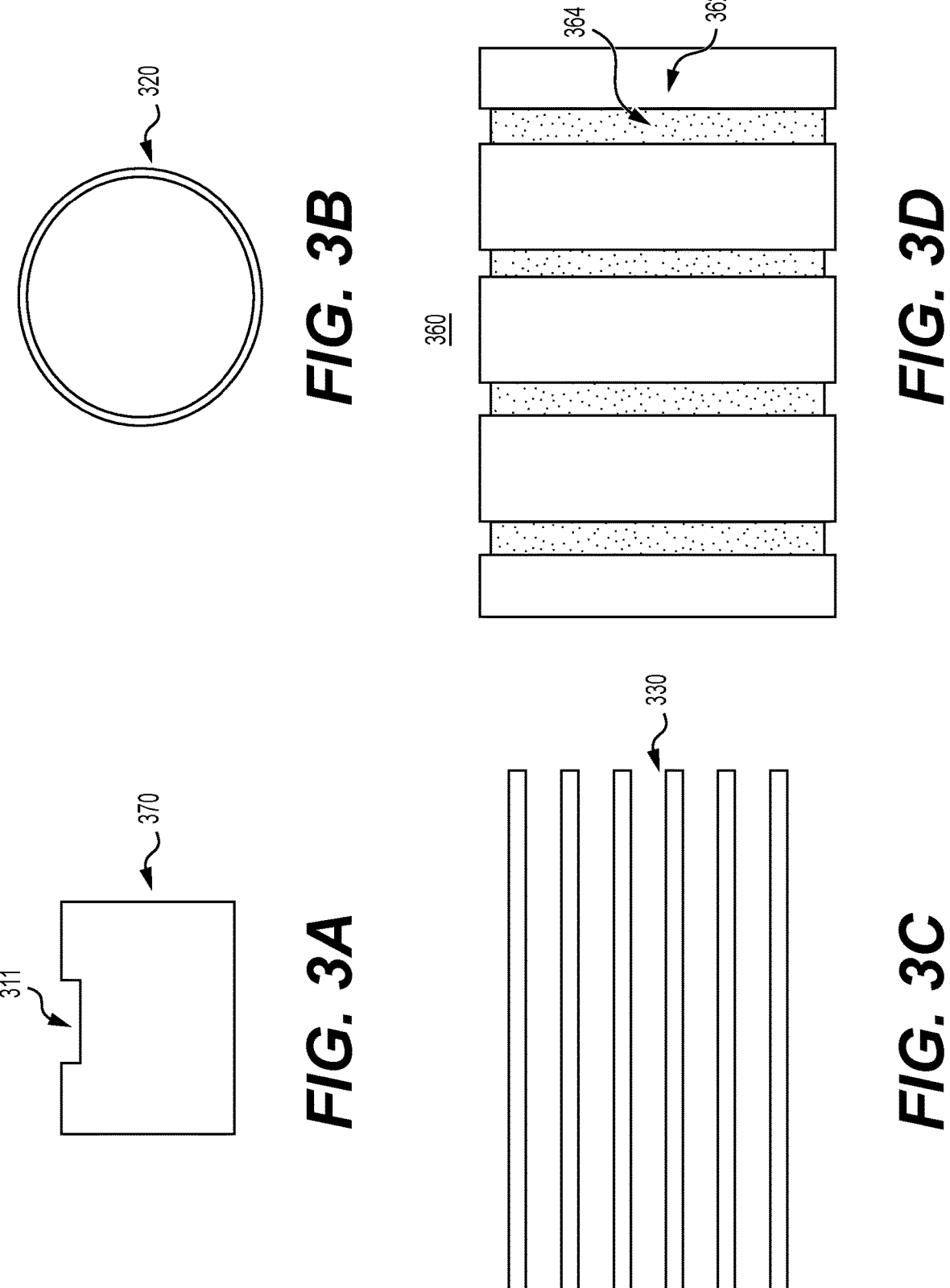
FIGS. 3A-3D depicts exemplary components of a rotor, according to one or more embodiments.

FIGS. 3A-3D depicts exemplary components of a rotor, according to one or more embodiments. FIG. 3A depicts a magnet 370 including a magnet groove 311, where magnet 370 has a greater thickness at a non-grooved portion than at magnet groove 311. FIG. 3B depicts a carbon ring 320. FIG. 3C depicts carbon tube 330 used for reinforcement of the lamination shoe 505 (see FIG. 5A and FIG. 5B) during operation. The carbon tube 330 (e.g., carbon tube 330 may include one or more carbon tubes) and the carbon ring 320 (e.g., carbon ring 320 may include one or more carbon rings) may reinforce the lamination shoe 505 and magnet 370 during operation. FIG. 3D depicts the rotor lamination stack 360 with first lamination sheet 362 (e.g., first lamination sheet 362 may include one or more first lamination sheets) and second lamination sheet 364 (e.g., second lamination sheet 364 may include one or more second lamination sheets). For example, one or more embodiments may include the magnet groove 311 and the second lamination sheet 364 in alignment with the carbon ring 320 placed thereon.

As described above, the number and width of the lamination stack groove (e.g., magnet groove 311 and second lamination sheet 364) may depend on the application and the target speed required to maximize the magnetic utilization. For example, one or more embodiments may include magnet groove 311 and second lamination sheet 364 that cover approximately 1% of an outermost surface of the rotor lamination stack 360 to approximately 99% of the rotor lamination stack 360. One or more embodiments may include magnet groove 311 as a single magnet groove and second lamination sheet 364 as a single second lamination sheet that cover from approximately 15% of an outermost surface of the rotor lamination stack 360 to approximately 85% of the outermost surface of the rotor lamination stack 360.

Figure 4:
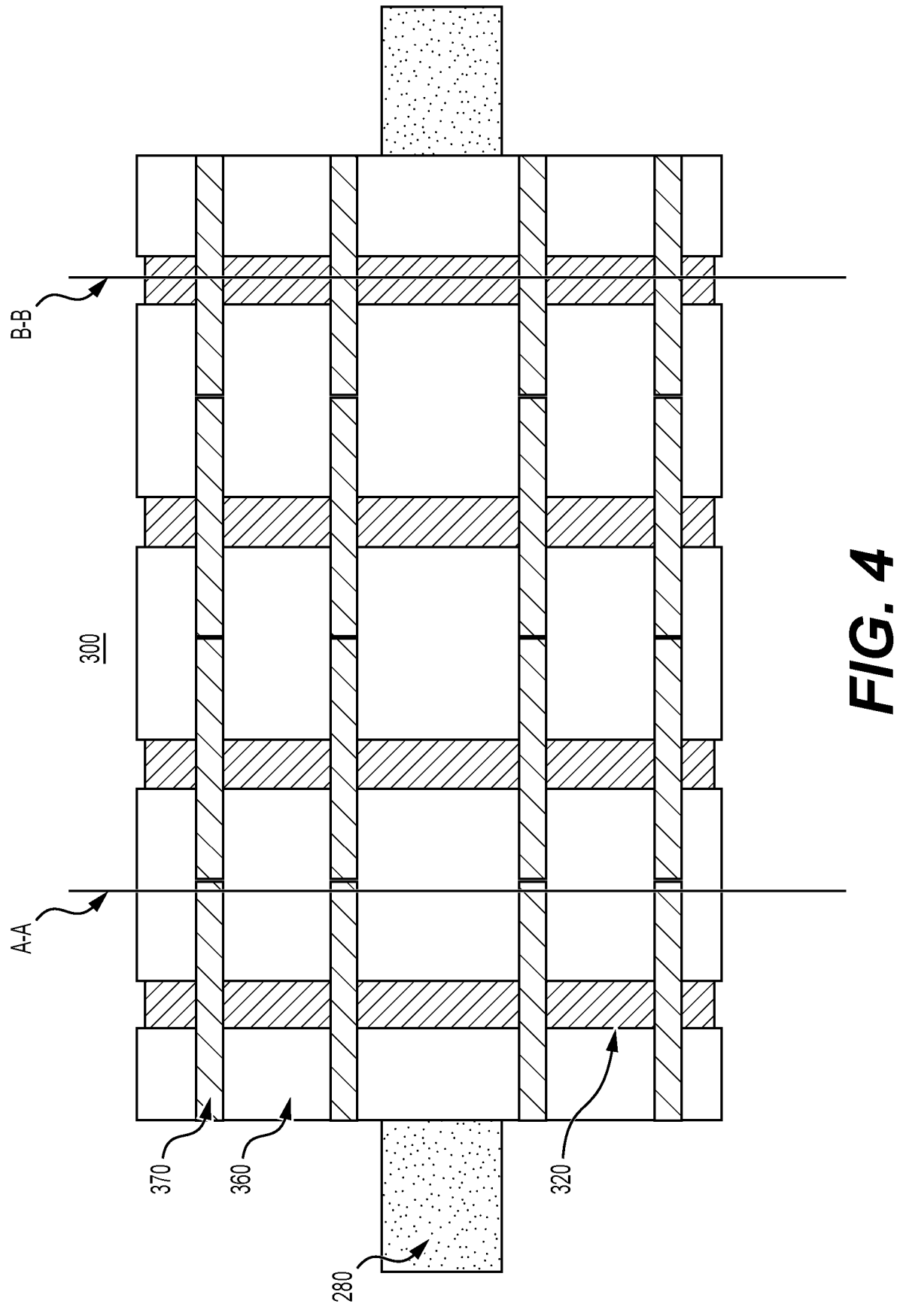
FIG. 4 depicts an exemplary side-view of a rotor, according to one or more embodiments.

FIG. 4 depicts an exemplary side-view of a rotor, according to one or more embodiments. The rotor 300 may include the rotor lamination stack 360, with magnet 370 aligned in a direction parallel to an axial direction of the rotor shaft 280. The rotor 300 may include carbon ring 320 located at second lamination sheet 364 (see FIG. 3D). As described above with reference to FIGS. 3A-3D, magnet 370 and second lamination sheet 364 may be in alignment for carbon ring 320 to be located at the exterior of magnet 370. One or more embodiments may include first lamination sheet 362 and second lamination sheet 364 arranged with sequence in the axial direction.

Figure 5B:
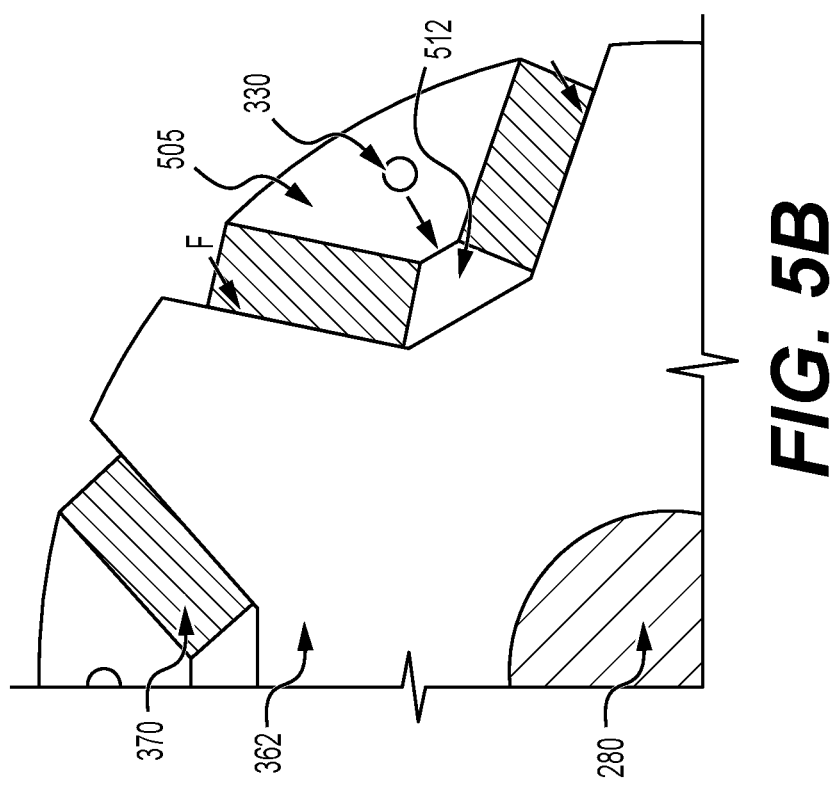
FIGS. 5A-5B depict a cross-section view of a sleeve-free portion of a rotor, according to one or more embodiments.
Figure 5A:
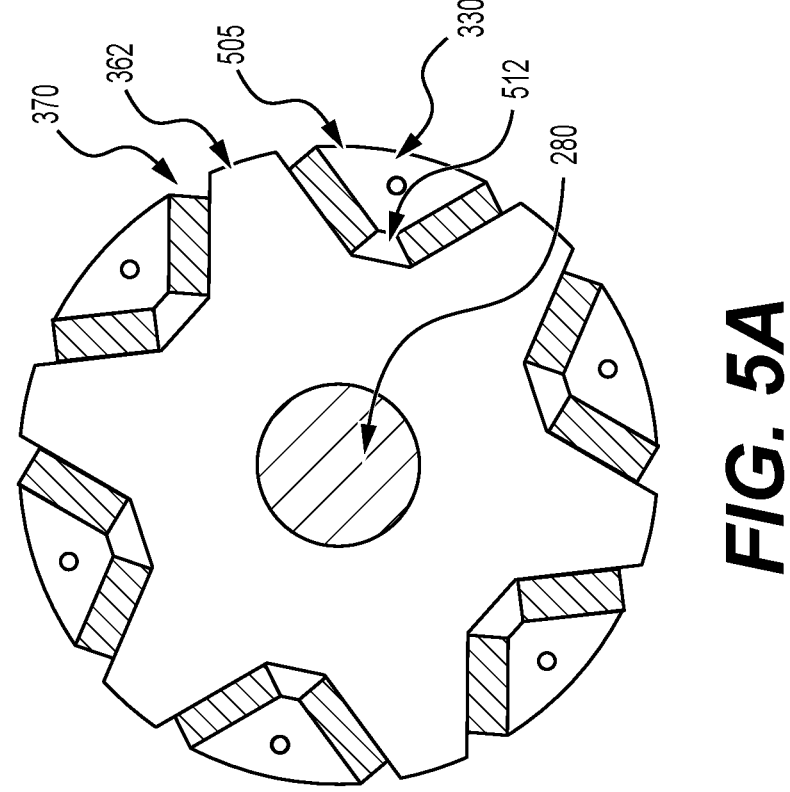

FIGS. 5A-5B depict a cross-section view of a sleeve-free portion of a rotor, according to one or more embodiments. FIGS. 5A-5B are a cross-sectional view from FIG. 4 (A-A) of first lamination sheet 362 (e.g., first lamination sheet 362 may include one or more first lamination sheets). The first lamination sheet 362 may include a plurality of lamination sheets, or lamination yoke sheets, having a first circumference. For example, a first circumference of first lamination sheet 362 may be greater than the second circumference of second lamination sheet 364 (see FIGS. 6A-6B). When first lamination sheet 362 includes multiple first lamination sheets, the first circumference of each first lamination sheet 362 may be equal.

The first lamination sheet 362 may be provided on a rotor shaft 280 with magnet 370 (e.g., magnet 370 may include one or more magnets) located in recess 512 (e.g., recess 512 may include one or more recesses) of the rotor lamination stack 360. The first lamination sheet 362 may include recess 512 for lamination shoe 505 (e.g., lamination shoe 505 may include one or more lamination shoes, or lamination shoe sheets) located on the exterior of magnet 370. The lamination shoe 505 may include a carbon tube 330 (e.g., carbon tube 330 may include one or more carbon tubes) extending through a hole in lamination shoe 505 in a direction parallel to an axial direction of the rotor shaft 280. For example, the centrifugal force (F) applied on the lamination shoe 505 during rotation of the rotor 300 may be counteracted (e.g., stabilized) using carbon tube 330.

Figures 6A, 6B:
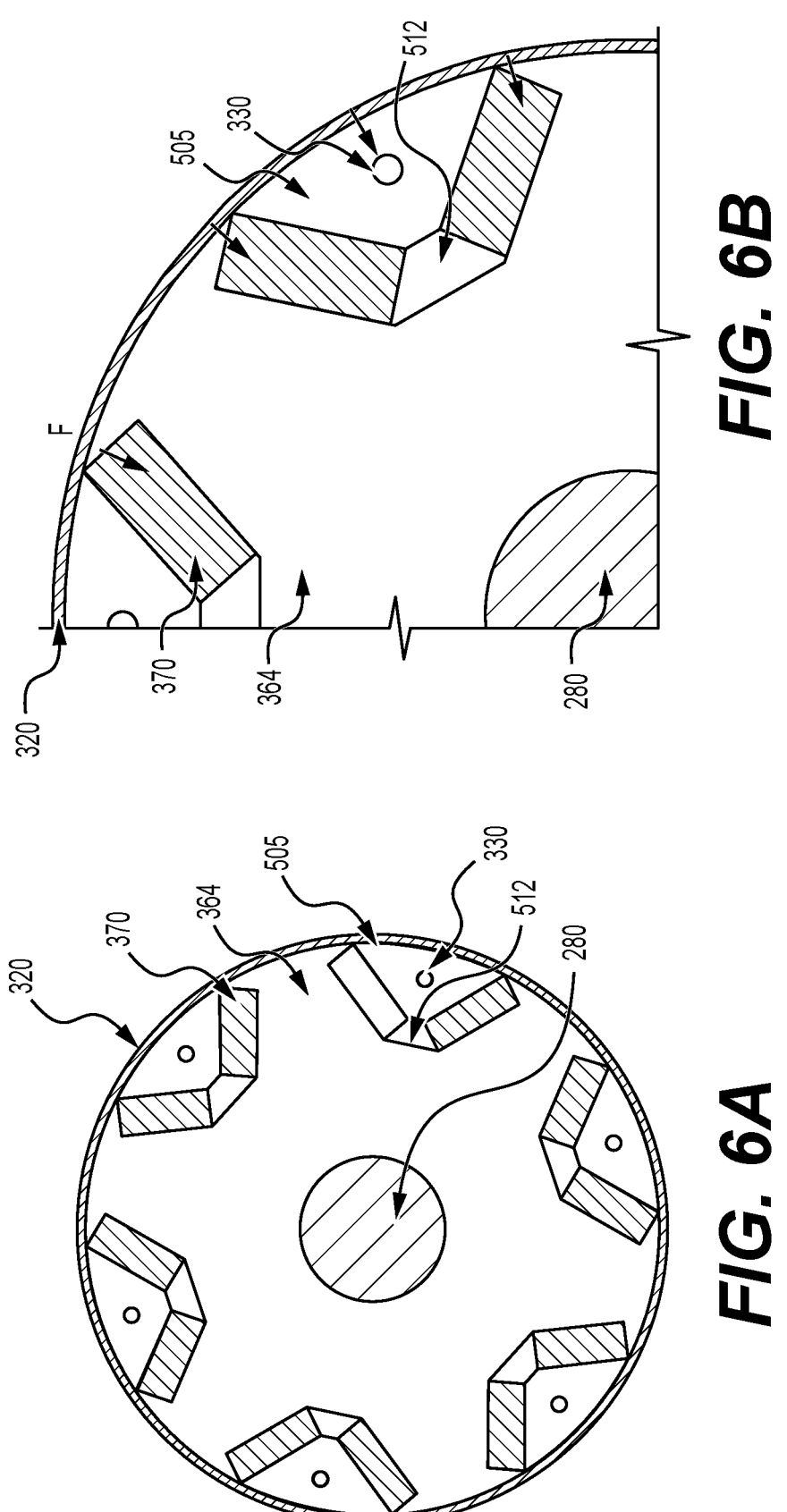
FIGS. 6A-6B depicts a cross-section view of a sleeved portion of a rotor, according to one or more embodiments.

FIGS. 6A-6B depicts a cross-section view of a sleeved portion of a rotor, according to one or more embodiments. FIGS. 6A-6B are a cross-sectional view of FIG. 4 (B-B) of a second lamination sheet 364 (e.g. second lamination sheet 364 may include one or more second lamination sheets). The second lamination sheet 364 may include a plurality of lamination sheets, or lamination yoke sheets, having a second circumference. For example, a second circumference of second lamination sheet 364 may be less than the first circumference of first lamination sheet 362 (see FIGS. 5A-5B). When second lamination sheet 364 includes multiple second lamination sheets, the second circumference of each second lamination sheet 364 may be equal.

The second lamination sheet 364 may be provided on a rotor shaft 280 with magnet 370 (e.g., magnet 370 may include one or more magnets) located in recess 512 (e.g., recess 512 may include one or more recesses) of the rotor lamination stack 360. The second lamination sheet 364 may include recess 512 for lamination shoe 505 (e.g., lamination shoe 505 may include one or more lamination shoes) located on top of magnet 370. The lamination shoe 505 may include a carbon tube 330 (e.g., carbon tube 330 may include one or more carbon tubes) extending through a hole in lamination shoe 505 in a direction parallel to an axial direction of the rotor shaft 280. The second lamination sheet 364 may have an outermost surface corresponding to a carbon ring 320 that is aligned on the exterior circumference of the lamination shoe 505. For example, the centrifugal force (F) applied to the lamination shoe 505 and magnet 370 may be counteracted (e.g., stabilized) by the carbon tube 330.

Figure 7:
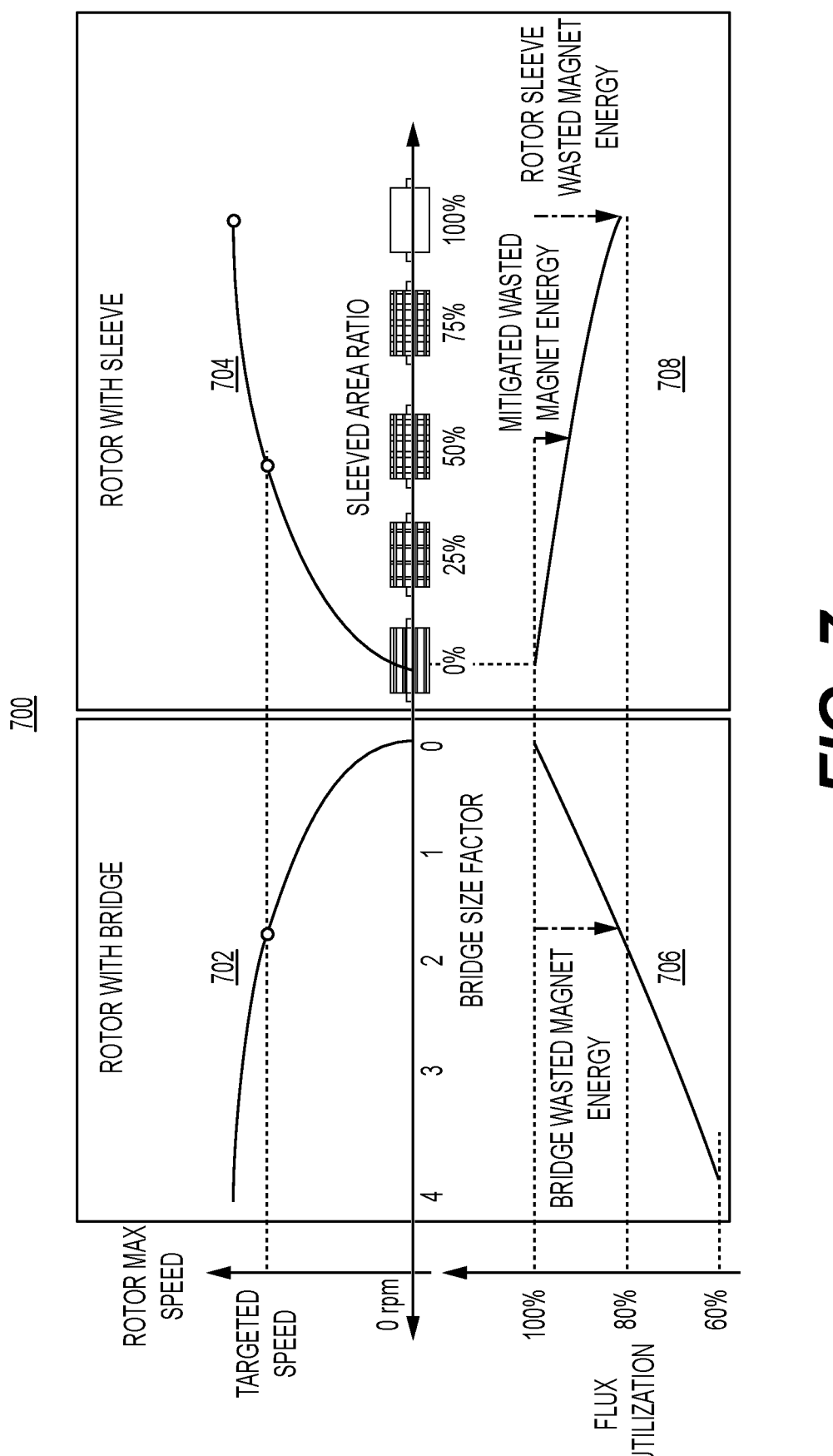
FIG. 7 depicts an exemplary graph of performance of rotors with different structures, according to one or more embodiments.

FIG. 7 depicts an exemplary graph of performance of rotors with different structures, according to one or more embodiments. Plot 702 and plot 706 of graph 700 depict the relationship between a rotor target speed and the size of the bridge. For example, a rotor with a bridge may be used at higher speeds due to the bridge reinforcing the lamination shoes and magnets in place counteracting the centrifugal forces. However, as the target speed increases, the flux utilization also decreases (e.g., increasing the waste of magnetic energy). The increase in magnetic energy waste decreases efficiency of the rotor.

Plot 704 and plot 708 of graph 700 depict the relationship between a rotor target speed and the coverage of the carbon rings. Plot 708 of graph 700 depicts the relationship of the rotor with carbon rings as the target speed increases and the flux utilization decreases.

One or more embodiments may include lamination bridges which are fully removed, avoiding flux shunt and providing high magnet utilization. In one or more embodiments, the air gap may be increased only locally, preserving a good magnet utilization. In one or more embodiments, higher speeds may be achieved with respect to the centrifugal force balancing using carbon rings and tubes. For example, the carbon ring sleeve may provide a better rotor magnetic field efficiency due to the position of the magnets closer to the outer diameter. In terms of material cost, the carbon ring sleeve may reduce the amount of carbon needed to keep the magnets and laminations in place (e.g., only rings where it is needed, not a complete wrapping of the rotor).

One or more embodiments may include a carbon ring sleeve to reduce the fabrication time and cost (e.g., less wrapping surface needed). One or more embodiments may improve the speed limit and the motor efficiency. For example, the carbon ring sleeve may be implemented by using carbon fiber or other type of composite material. The carbon ring sleeve may be applied to several type of motors (e.g., surface mounted permanent magnet synchronous motor). One or more embodiments may include altering the number and size of the carbon rings based on application specific needs.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising a motor, the motor including:
a stator including one or more windings; and
a rotor to rotate relative to the stator based on a current in the one or more windings, the rotor including:
a rotor shaft;
a lamination stack on the rotor shaft, the lamination stack including:
a lamination yoke including a recess in an outermost surface of the lamination yoke and a first groove in the outermost surface of the lamination yoke;
a lamination shoe in the recess of the lamination yoke, the lamination shoe including a second groove in an outermost surface of the lamination shoe; and
one or more first magnets in the recess of the lamination yoke between the lamination yoke and the lamination shoe, each first magnet of the one or more first magnets including a first magnet groove, wherein the first groove of the lamination yoke, the second groove of the lamination shoe, and the first magnet groove are aligned along a first circumference of the lamination stack as a first lamination stack groove; and
one or more carbon rings in the first lamination stack groove.

2. The system of claim 1, further including:
one or more second magnets in the recess of the lamination yoke between the lamination yoke and the lamination shoe, each second magnet of the one or more second magnets including a second magnet groove,
wherein the lamination yoke includes a third groove in the outermost surface of the lamination yoke, and the lamination shoe includes a fourth groove in the outermost surface of the lamination shoe, and
wherein the third groove of the lamination yoke, the fourth groove of the lamination shoe, and the second magnet groove are aligned along a second circumference of the lamination stack as a second lamination stack groove.

3. The system of claim 2, further including:
one or more carbon rings in the second lamination stack groove.

4. The system of claim 3, wherein the one or more carbon rings cover from approximately 15% of an outermost surface of the lamination stack to approximately 85% of the outermost surface of the lamination stack.

5. The system of claim 1, further including:
one or more carbon tubes extending through the lamination shoe of the lamination stack in a direction parallel to an axial direction of the rotor shaft.

6. The system of claim 1, wherein the rotor does not include a bridge to stabilize the one or more first magnets in the recess of the lamination yoke.

7. The system of claim 1, further comprising:
an inverter configured to convert DC power from a battery to AC power to drive the one or more windings of the stator of the motor; and
the battery configured to supply the DC power to the inverter,
wherein the system is provided as a vehicle including the inverter, the battery, and the motor.

8. A system comprising a rotor, the rotor including:
a rotor shaft;
a lamination stack on the rotor shaft, the lamination stack including:
a lamination yoke including a recess in an outermost surface of the lamination yoke and a first groove in the outermost surface of the lamination yoke;
a lamination shoe in the recess of the lamination yoke, the lamination shoe including a second groove in an outermost surface of the lamination shoe; and
one or more first magnets in the recess of the lamination yoke between the lamination yoke and the lamination shoe, each first magnet of the one or more first magnets including a first magnet groove, wherein the first groove of the lamination yoke, the second groove of the lamination shoe, and the first magnet groove are aligned along a first circumference of the lamination stack as a first lamination stack groove; and
a first carbon ring in the first lamination stack groove.

9. The system of claim 8, the rotor further including:
one or more second magnets in the recess of the lamination yoke between the lamination yoke and the lamination shoe, each second magnet of the one or more second magnets including a second magnet groove,
wherein the lamination yoke includes a third groove in the outermost surface of the lamination yoke, and the lamination shoe includes a fourth groove in the outermost surface of the lamination shoe, and
wherein the third groove of the lamination yoke, the fourth groove of the lamination shoe, and the second magnet groove are aligned along a second circumference of the lamination stack as a second lamination stack groove.

10. The system of claim 9, the rotor further including:
a second carbon ring in the second lamination stack groove.

11. The system of claim 8, wherein the first carbon ring covers from approximately 15% of an outermost surface of the lamination stack to approximately 85% of the outermost surface of the lamination stack.

12. The system of claim 8, the rotor further including:
a carbon tube extending through the lamination shoe of the lamination stack in a direction parallel to an axial direction of the rotor shaft.

13. The system of claim 8, wherein the lamination yoke includes a plurality of lamination yoke sheets, and the lamination shoe includes a plurality of lamination shoe sheets.

14. The system of claim 8, wherein the rotor does not include a bridge to stabilize the one or more first magnets in the recess of the lamination yoke.

15. A system comprising a rotor, the rotor including:

a rotor shaft;

a lamination stack including a first lamination sheet, a second lamination sheet, and one or more magnets, the first lamination sheet and the second lamination sheet on the rotor shaft, and the first lamination sheet having a greater circumference than the second lamination sheet;

the first lamination sheet including:

a first lamination yoke including a first recess in an outermost surface of the first lamination yoke; and a first lamination shoe located in the first recess;

the second lamination sheet including:

a second lamination yoke including a second recess in an outermost surface of the second lamination yoke; and a second lamination shoe located in the second recess;

the one or more magnets including a first portion and a second portion, the first portion of the one or more magnets having a greater thickness than the second portion of the one or more magnets, the one or more magnets being in the first recess between the first lamination yoke and the first lamination shoe and in the second recess between the second lamination yoke and the second lamination shoe, wherein the first portion of the one or more magnets aligns along a first circumference of the lamination stack with the first lamination sheet and the second portion of the one or more magnets aligns along a second circumference of the lamination stack with the second lamination sheet; and a carbon ring on the outermost surface of the second lamination yoke, an outermost surface of the second lamination shoe, and an outermost surface of the second portion of the one or more magnets.

16. The system of claim 15, wherein the lamination stack further includes:

a third lamination sheet, the third lamination sheet having a circumference equal to the second lamination sheet;

the third lamination sheet including:

a third lamination yoke including a third recess in an outermost surface of the third lamination yoke; and a third lamination shoe located in the third recess;

the one or more magnets further being in the third recess between the third lamination yoke and the third lamination shoe, wherein the second portion of the one or more magnets further aligns along a third circumference of the lamination stack with the third lamination sheet.

17. The system of claim 16, wherein the carbon ring is further located on an outermost surface of the third lamination yoke and an outermost surface of the third lamination shoe.

18. The system of claim 15, further including:

a carbon tube, wherein the first lamination shoe includes a first hole, wherein the second lamination shoe includes a second hole, and wherein the carbon tube extends through the first hole and the second hole in a direction parallel with an axial direction of the rotor shaft.

19. The system of claim 15, wherein the one or more magnets include a first magnet and a second magnet.

20. The system of claim 15, wherein the rotor does not include a bridge between the first lamination yoke and the first lamination shoe, or between the second lamination yoke and the second lamination shoe.

* * * * *